US006193409B1

(12) United States Patent
Brunson et al.

(10) Patent No.: US 6,193,409 B1
(45) Date of Patent: Feb. 27, 2001

(54) TANK AGITATOR HAVING A CLEAN-IN-PLACE SHAFT AND SEAL ASSEMBLY

(75) Inventors: Jeffrey W. Brunson, Nixa; Ira O. Fees, Republic; Mikell K. Mills, Springfield; Gregory M. Posten, Walnut Grove, all of MO (US)

(73) Assignee: Paul Mueller Company, Springfield, MO (US)

( * ) Notice: Subject to any disclaimer, the term of this patent is extended or adjusted under 35 U.S.C. 154(b) by 0 days.

(21) Appl. No.: 09/329,919

(22) Filed: Jun. 10, 1999

(51) Int. Cl.[7] ................................ B01F 7/02; F16J 15/34
(52) U.S. Cl. ........................ 366/331; 366/608; 277/370
(58) Field of Search ...................... 366/608, 332, 366/333, 331, 285, 286, 281, 282, 283, 284, 289; 277/370, 306, 630

(56) References Cited

U.S. PATENT DOCUMENTS

| | | | |
|---|---|---|---|
| 2,096,597 | * 10/1937 | Seabrooks | 366/331 |
| 2,475,550 | * 7/1949 | Larsen | 277/370 |
| 2,746,779 | * 5/1956 | Labanoff | 366/331 |
| 2,863,680 | * 12/1958 | Taltavall, Jr. | 277/370 |
| 2,911,240 | * 11/1959 | Boutros et al. | 277/370 |
| 2,945,711 | * 7/1960 | Dykman | 366/331 |
| 3,129,010 | * 4/1964 | Stratienko | 277/370 |
| 3,166,330 | * 1/1965 | Boutros | 277/370 |
| 3,433,540 | * 3/1969 | Schneider | 277/370 |
| 3,715,169 | * 2/1973 | Molis | 277/370 |
| 3,743,302 | * 7/1973 | Bach et al. | 277/370 |
| 3,887,169 | * 6/1975 | Maynard | 366/307 |
| 3,947,944 | * 4/1976 | Washington | 277/370 |
| 3,961,799 | * 6/1976 | Peet | 277/370 |
| 3,988,026 | * 10/1976 | Kemp, Jr. | 277/370 |
| 4,106,778 | * 8/1978 | Cormack et al. | 277/370 |
| 4,256,313 | * 3/1981 | Arnold | 277/370 |
| 4,383,768 | * 5/1983 | Kupka | 277/370 |
| 4,511,255 | 4/1985 | Saucier | 366/138 |
| 4,786,061 | * 11/1988 | Buchalla | 277/370 |
| 4,858,936 | * 8/1989 | Adams | 277/370 |
| 5,040,899 | * 8/1991 | Koskien | 366/281 |

OTHER PUBLICATIONS

John Crane®, "Type 21 Elastometer Bellows Seal, " 1992, Sales Brochure.
DCI, Inc., "Agitator Instructions, CIP Cleanable, Nord SK3282AF," Aug. 4, 1994, Drawing.
Roplan, "Proposal 2/1—Single Seal Applicable to Mueller," Oct. 7, 1998, Drawing.
Roplan, "For the Lowest Total Sealing Cost," p. 1–4, Jan. 1997, Advertisement.
3–A Sanitary Standards Symbol Administrative Council, "3–A® Mark of Compliance," Brochure.
Walker Stainless Equipment, "Sanitary Optimum Angle Agitator," p. 1–2, Advertisement.
Zero Maintenance Technologies, "Model MX100–52," Oct. 9, 1998, Drawing.
"Application–Matched Seals," Apr. 1997, Advertisement.
Paul Mueller Company, "Mueller® Silo Installation and Operation Manual," Jan. 11, 1998, p. 12–14, Manual.

* cited by examiner

Primary Examiner—Tony G. Soohoo
(74) Attorney, Agent, or Firm—Howell & Haferkamp, LC

(57) ABSTRACT

An agitator assembly includes a dynamic or rotary seal which has a pusher for mechanically separating the seal members as the agitator is moved into a clean-in-place orientation. There are three embodiments of the invention, with all embodiments including a pusher mounted on the drive shaft so that as the seal is moved with respect to the drive shaft by either moving the drive shaft or the seal, the pusher engages one of the seal members to mechanically separate it from the other seal member. The pusher preferably comprises a shaft mounted "O" ring in two of the embodiments, and a ring shaped and tapered structure in the other embodiment. The embodiments provide for a seal that has springs located within the tank, a seal with an elastomer to provide the spring sealing force, and a seal with springs located outside the tank.

32 Claims, 6 Drawing Sheets

TANK AGITATOR HAVING A CLEAN-IN-PLACE SHAFT AND SEAL ASSEMBLY

BACKGROUND AND SUMMARY OF THE INVENTION

Horizontal agitators for use in large vats or tanks are generally comprised of a drive motor and an extended shaft assembly with an impeller mounted at the inboard end of the shaft. These agitators serve to mix and stir various materials contained in the tank, depending on the application. In many instances, the USDA and other regulatory authorities are involved as the material being processed in the tank is a food grade material and can include beer, wine, milk, etc. For many years these tanks have been used and various regulations have been promulgated to require the sanitary handling of these foodstuffs. This has included a "clean-in-place" requirement for these horizontal agitators meaning that the shaft and its seals must be capable of being cleaned without removal of the agitator from the tank. Recently, these regulations have been strengthened to require that the sealing surfaces be mechanically or hydraulically separated or unseated to expose all the dynamic sealing surfaces, and that the sealing contact intersection of all seals be exposed to cleaning solutions, among other requirements. While clean-in-place agitators have previously been designed and used, these prior designs do not meet these new tougher standards. One such example is found in U.S. Pat. No. 4,511,255, the disclosure of which is incorporated herein by reference. As shown in that patent, an elongated drive shaft has an impeller at its inboard end and a bearing/seal member in an extended shaft housing comprised of a plastic plug and cylindrical passage which serves as a journal bearing for the base of the impeller. A second dynamic seal is positioned at the outer end of the drive shaft and the shaft housing. When it is desired to clean the inner seal, cleaning fluid is pumped into the shaft housing under pressure that overcomes the spring pressure that seats the outer bearing/seal members together to, ideally, unseat them and allow the cleaning fluid to flow through the shaft housing and past the seal members out into the tank. The outboard seal stays in sealing orientation and prevents the cleaning fluid from flowing back into the body of the agitator and has sealing surfaces that are neither separated or cleaned. Thus, the '255 patent device relies on fluid pressure to overcome spring force to separate only the outer bearing/seal members and permit cleaning fluid to clean their mating surfaces. Additionally, with this construction the cleaning fluid is directed to flow into the same tank where the foodstuff is contained, including the contaminants cleaned from the entirety of the extended shaft housing and the seal surfaces. This is undesirable as the contaminants are then required to be reliably washed out of the tank as well. Nor does this device provide a mechanical separation of the sealing surfaces.

In order to remedy the shortcomings of the prior art and to provide an agitator with a shaft and seal assembly that uses a mechanical force to truly and reliably separate the seal members, the inventors herein have succeeded in designing and developing the present invention in its various embodiments. Not only are the problems of the prior art resolved, but additional advantages are provided that were previously not provided. In a first embodiment of the present invention, a spring retainer and spring are mounted onto the agitator shaft and urge a dynamic seal member against a second seal member which seats against the tank sidewall. An "O" ring seals the first dynamic seal member to the shaft. All of these components are located inside the tank, with the agitator shaft extending through a hole in the tank sidewall. An "O" ring, or "pusher", is circumferentially mounted on the outboard end of the agitator shaft, outboard of the seal components, and positioned to be located outside the tank. When cleaning of the seal is desired, the agitator shaft is pushed into the tank far enough to bring the pusher "O" ring into mechanical contact with the second seal member to physically separate it from the tank sidewall where it might otherwise tend to remain due to any accumulation of foodstuff or as a result of the compressive forces of the spring against it. Then, cleaning fluid is sprayed onto the shaft from inside the tank, as all of the seal components including the pusher are physically positioned inside the tank. This eliminates the dumping of cleaning fluid and contaminants into the tank. Some cleaning solution will flow past the second seal member and out of the tank.

In a second embodiment of the present invention, an elastomeric "plug" is slidably mounted onto the agitator shaft and it has a seating surface against which a fixed, matching seal member bears to urge it into a hole in the tank sidewall. Thus, as the shaft turns, the elastomeric portion remains in static seal with the tank sidewall and the inboard end serves as a sealing surface for the matching seal member against which it rotates. Outboard of the elastomeric plug, and positioned outside the tank, is a circumferentially mounted "pusher" which has a profile to engage the elastomeric plug and physically separate it from the tank sidewall as the agitator shaft is pushed into the tank for cleaning. The elastomeric portion of the seal member, when compressed, provides the sealing pressure to maintain the seal against the tank. As with the first embodiment, all but the pusher member is located inside the tank during operation. Also, the elastomeric member may have a cylindrical shoulder which helps to close off the tank opening as the cleaning fluid is sprayed so as to minimize the amount of fluid and contaminant that flows out of the tank. A further advantage is that the seal construction eliminates the use of a coiled spring, which simplifies the design and makes it less expensive and more sanitary.

A third embodiment of the present invention is somewhat different from the first two embodiments and provides additional advantages even beyond that offered by the first two embodiments. With this embodiment, the agitator shaft need not be moved to separate the seal for cleaning. Also, the spring member is positioned outside the tank. More particularly, a rotary seal member is fixed to the inboard of the agitator shaft so as to be located inside the tank. A rotary seal disk is slidably mounted adjacent the rotary seal member and provides the surface against which the dynamic seal is formed. The rest of the seal is contained inside a housing which is mounted to the outside of the tank. This includes a spring loaded, nose shaped seal member which extends through a hole in the tank and which is urged against the rotary seal disk by the springs. A dynamic seal is formed between these two seal members. The spring loaded seal member may be retracted by mechanically withdrawing it from inside the tank hole, and an "O" ring pusher mounted on the agitator shaft engages the rotary seal disk should it not readily separate from the nose shaped seal member and mechanically separates it therefrom. With this embodiment, the cleaning fluid may be sprayed from inside the tank and allowed to flow outside the tank, carrying the seal contaminants with it. This embodiment is perhaps not as mechanically simple or elegant as the other embodiments, but the other advantages offered by it may be important enough to consider it for any particular application.

While the principal advantages and features of the present invention have been briefly explained above, a greater understanding may be attained by referring to the drawings and description of the preferred embodiment which follow.

DETAILED DESCRIPTION OF THE PREFERRED EMBODIMENT

Figure 1:
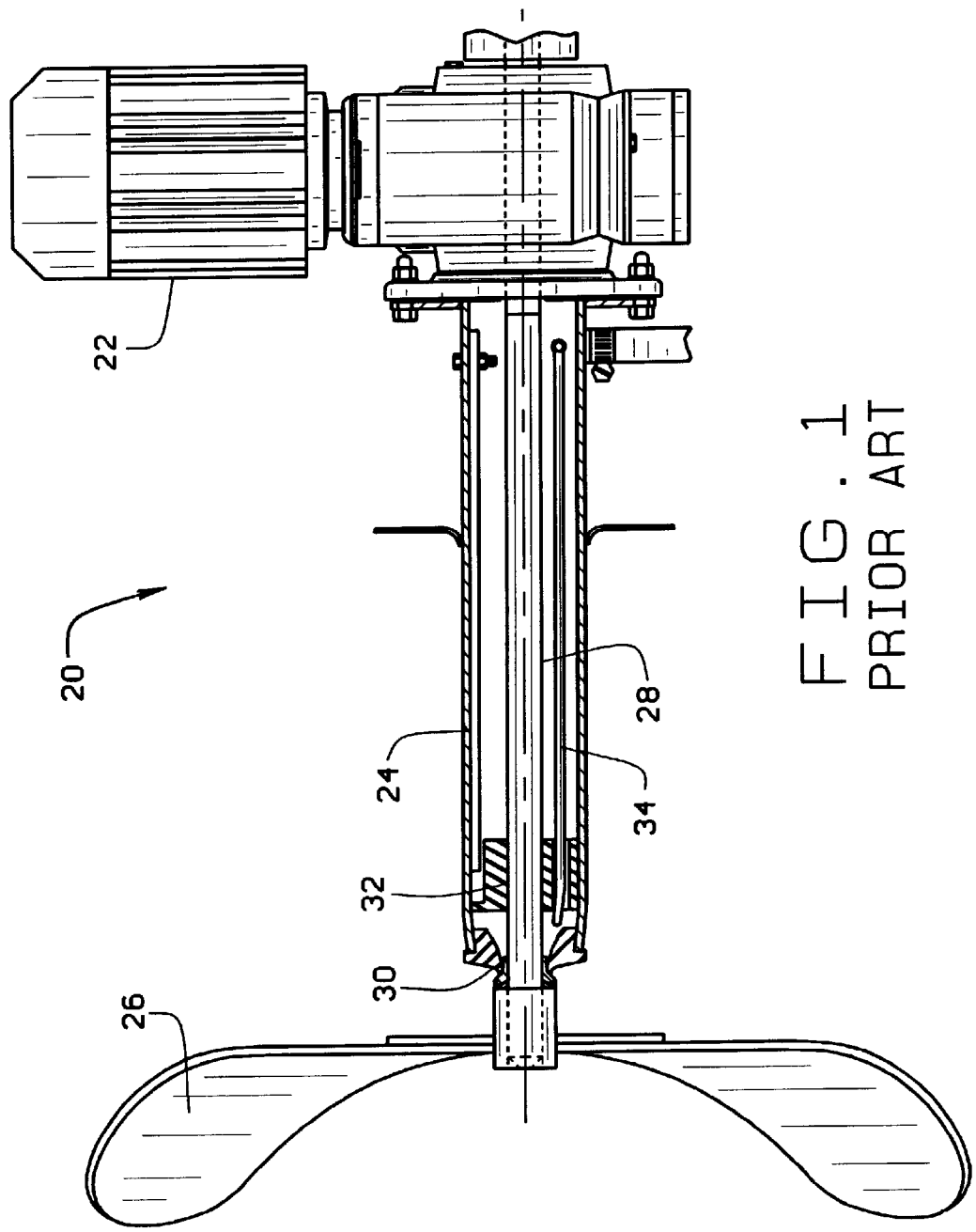
FIG. 1 is a partial cross sectional view of a prior art agitator with a clean-in-place system acceptable under old practice.
Figure 2:
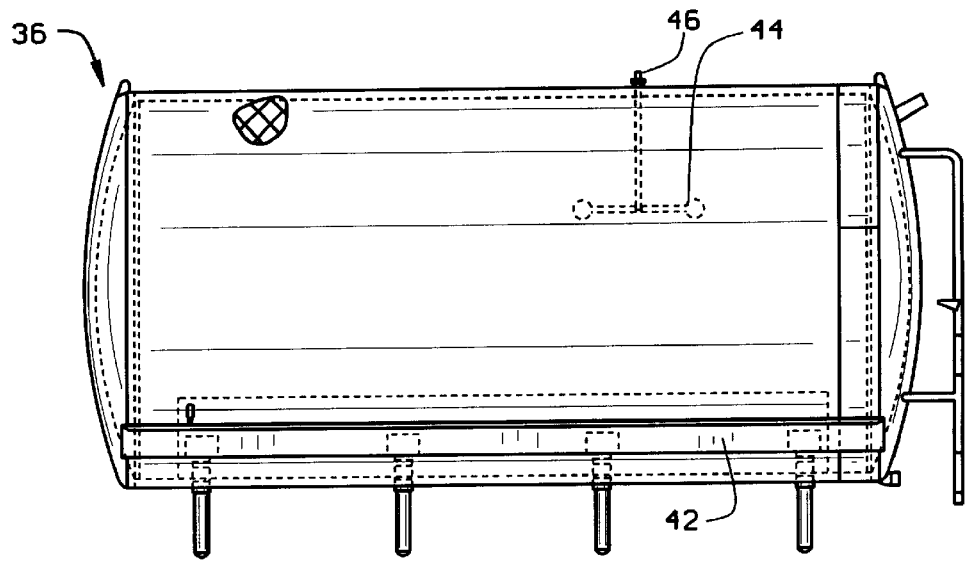
FIG. 2 is a partial cross sectional view of tank in which an agitator having a clean-in-place system might be used.
Figure 3:
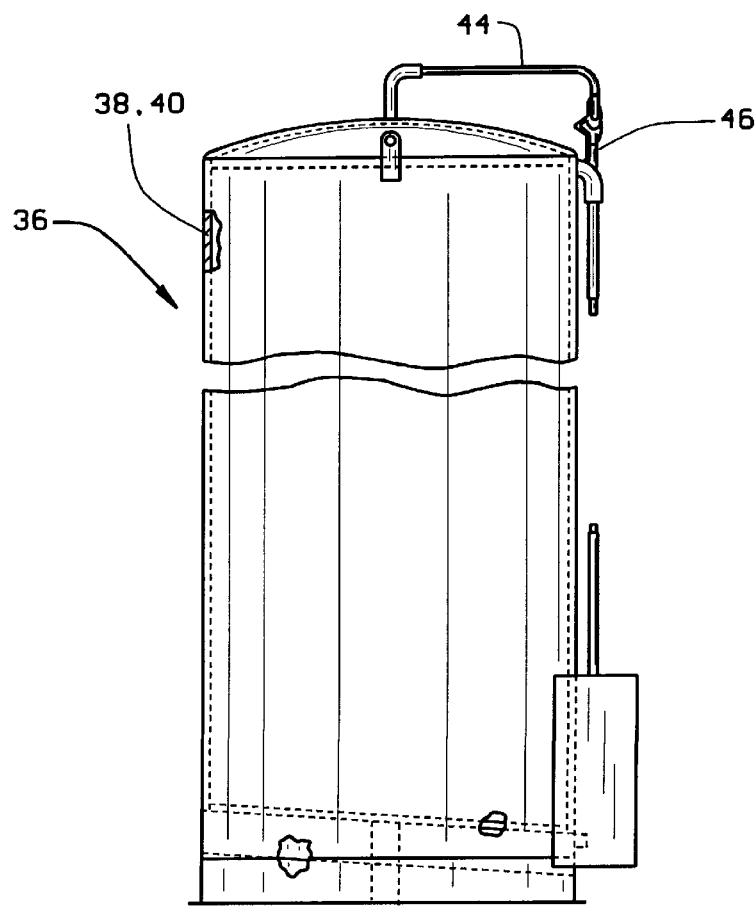
FIG. 3 is a partial cross sectional view of another tank in which an agitator having a clean-in-place system might be used.

In addition to the prior art agitator shown in the '255 patent referenced above, another example of a prior art agitator 20 is shown in FIG. 1 and includes a gear motor 22 with an extended housing 24 for locating an impeller 26 well into the tank or vessel (see FIGS. 2 & 3). The housing 24 surrounds a drive shaft 28 which is supported at its outboard end by a dynamic seal 30 and bearing 32. For cleaning operation, the drive shaft 28 is removed from the gear motor, housing, tank, etc., and all parts are manually cleaned.

As shown in FIGS. 2 and 3, a silo type tank 36 may be oriented either in a horizontal position (FIG. 2) or in a generally vertical position (FIG. 3) and may include additional superstructure along its exterior surfaces such as cooling jackets 38, insulated walls 40 and support beams 42. These tanks are generally considered to be food grade in that they are preferably fabricated from stainless steel, and are free of ledges, crevices and small radius corners which minimizes inadvertent build up of the material being processed as well as providing an aid to full and complete cleaning of the tank 34. A spray device 44 is generally provided near the top of the tank 36 and, during the cleaning cycle, cleaning solution flows from the spray device 44 and cascades down the tank inner side wall to clean the tank surfaces. The inlet and outlet connections 46 are conveniently back flushed for cleaning. Additional spray devices may be positioned throughout the tank 36 to insure a full and complete cleaning of the inner tank surfaces as well as a complete cleaning of the agitator assemblies. Agitators are usually positioned in the alcove area for vertical silos as shown in FIG. 3 and, on the front head area for horizontal silos as shown in FIG. 2 such that the tank must be entered in order to remove the agitator, drive shaft and impeller.

Figure 4:
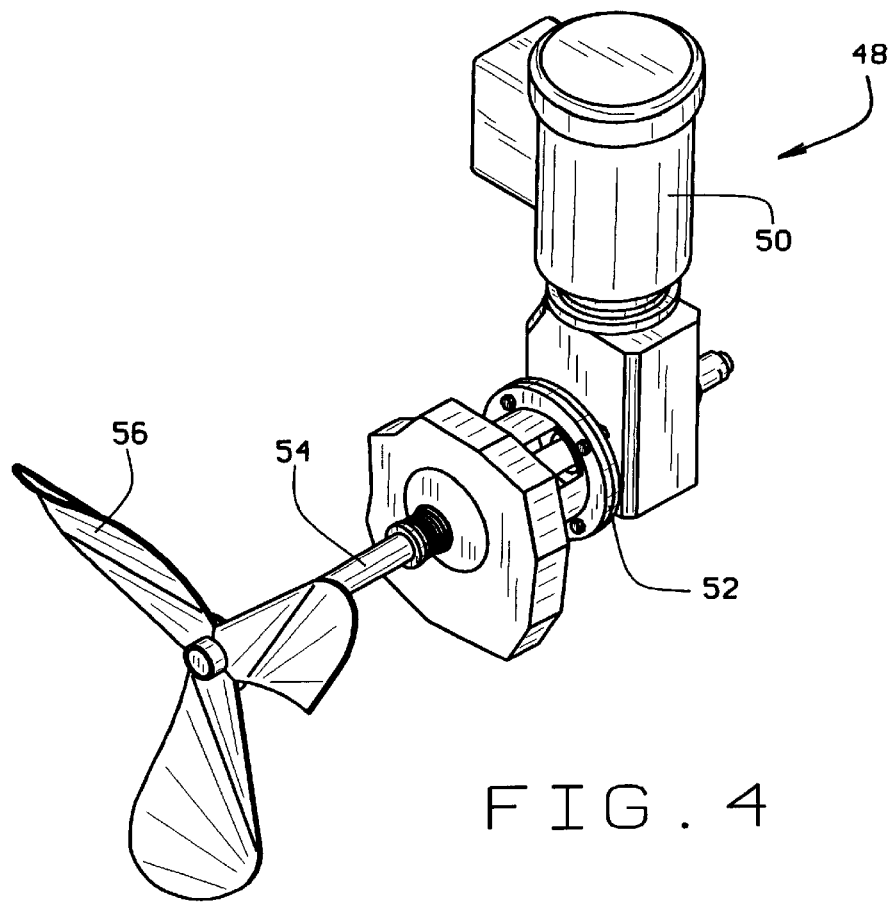
FIG. 4 is a perspective view of an agitator having a clean-in-place shaft and seal assembly of the first embodiment of the present invention.
Figure 5A:
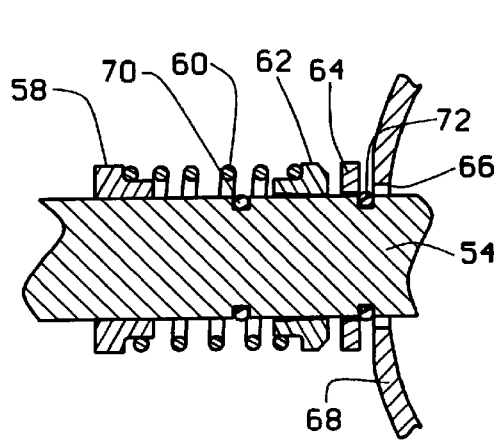
FIGS. 5A & B are cross sectional views of the shaft and seal assembly of the first embodiment as it would be oriented for cleaning and operation, respectively.
Figure 5B:
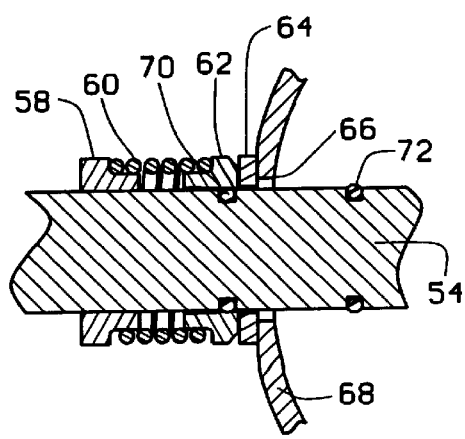

The first embodiment of the present invention is shown in FIGS. 4 and 5 as the agitator 48 including the typical major components thereof such as a gear motor 50, mounting flange 52, drive shaft 54, and impeller 56. As shown in greater detail in FIGS. 5A and B, and first with respect to FIG. 5B, this first embodiment is shown as it should be positioned for normal operation. The first embodiment includes a spring retainer 58 fixedly secured to the drive shaft and which has a sufficient profile and cross-sectional dimension to retain the sealing spring 60 and compress it against a slideably mounted rotary or dynamic seal 62. The dynamic seal 62 is urged against a stationary seal 64 which seals the drive shaft 54 within an opening 66 in tank side wall 68. An "O" ring 70 is oriented to underlie the dynamic seal 62 as the seal is engaged. Thus, as the drive shaft 54 rotates, the dynamic seal member 62 rotates with drive shaft 54 against the stationary seal member 64. The dynamic seal member 62 is preferably made of stainless steel, or other suitable bearing material, and the stationary seal member 64 may have a stainless steel washer or other surface integrally formed therein against which the dynamic seal member 62 is urged and slides. As can be appreciated, substantially the entirety of the seal comprising the first embodiment is interior to the tank side wall, other than the pusher which will now be described in more detail.

As shown in FIG. 5A, the sealing members are separated, and mechanically dislodged from their sealing surfaces by advancing the drive shaft 54 inwardly, or inboard from the agitator. As shown therein, the spring 60 relaxes but, as it is attached to the dynamic seal 62 it disengages dynamic seal 62 from stationary seal 64 which, through the buildup of sediment or otherwise, may remain attached to the tank side wall 68. However, a pusher preferably comprising an "O" ring 72 mechanically engages stationary seal member 64 and dislodges it, if necessary, from the tank sidewall 68. Thus, simply advancing the drive shaft 54 ensures that the seal members 62, 64 separate both from themselves as well as from the tank sidewall 68. As the seal reaches its separated orientation, cleaning fluid may be sprayed thereon from a spray device located in close proximity such that the exposed sealing surfaces are cleaned appropriately. To the extent that any cleaning solution flows past the dislodged stationary seal 64, and "O" ring pusher 72, through opening 66, it will flow into the agitator drive shaft housing and not re-enter the tank. Thus, this arrangement avoids the disadvantage in the prior art of flushing contaminants from the agitator drive shaft housing into the tank. Movement of the drive shaft between the relative positions shown in FIGS. 5A and B will automatically result in the orientation of the seal from a clean-in-place orientation to a sealing orientation, respectively and vice versa.

Figure 6:
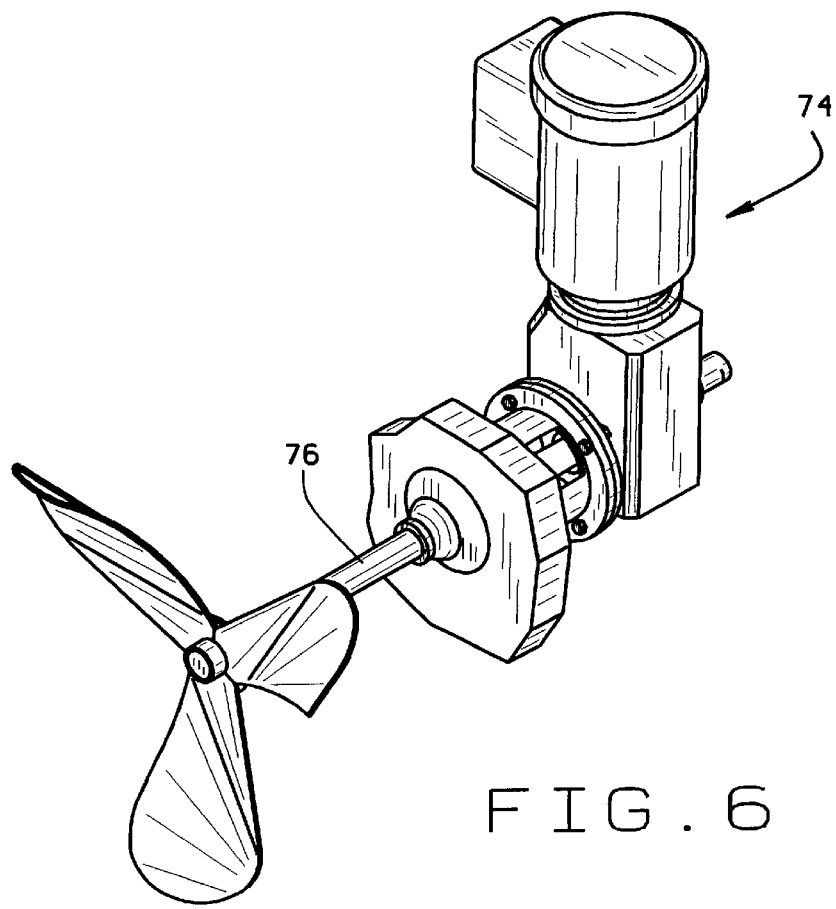
FIG. 6 is a perspective view of an agitator having a clean-in-place shaft and seal assembly of the second embodiment of the present invention.
Figure 7A:
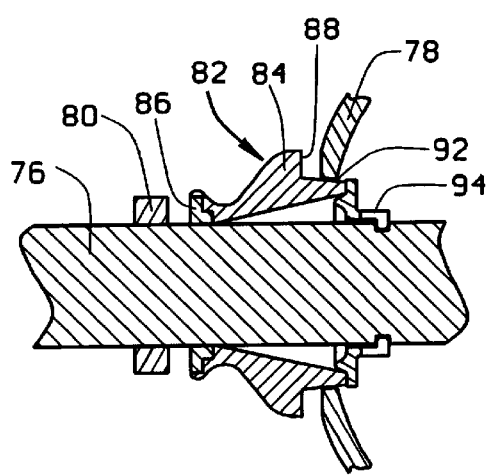
FIGS. 7A & B are cross sectional views of the shaft and seal assembly of the second embodiment as it would be oriented for cleaning and operation, respectively.
Figure 7B:
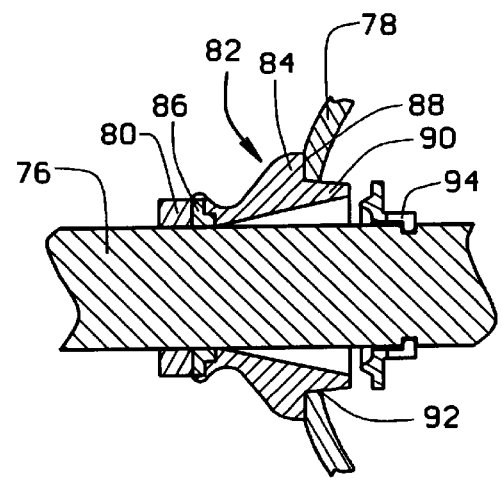

A second embodiment of the present invention is showed in FIGS. 6 & 7 with an agitator 74 shown in FIG. 6 and details of the second embodiment are shown more particularly in the cross sectional views of FIGS. 7A and B. The second embodiment shares some similarities to the first embodiment in that the drive shaft 76 is moved with respect to the tank side wall 78 in order to engage and disengage the seal, and the seal members are mechanically separated for clean-in-place operation. The seal is shown in a sealing configuration in FIG. 7B and includes a rotary seal 80 fixedly secured to the agitator drive shaft 76. A compound stationary seal 82 is comprised of an elastomeric portion 84 with a metallic insert 86. This metallic insert 86 may be any appropriate material which provides a bearing surface for the rotary seal 80 as the shaft 76 rotates. Alternatively, a separate washer could be provided. The elastomeric portion 84 has a shoulder 88 with a tapered nose 90 which fits within an opening 92 in the tank side wall 78. As shown in FIG. 7B, the shoulder 88 and tapered nose 90 are engaged with the opening 92 and the surfaces are sealed thereby. To unseat the seal, as previously mentioned the drive shaft 76 is moved to the left, or inwardly towards the tank, such that a pusher 94 which is fixedly secured to the driveshaft 76 engages the tapered nose 90 and separates the shoulder 88 from the tank side wall 78. The pusher 94 has a matching tapered nose which helps to maintain the elastomeric portion 84 in a centered orientation with respect to opening 92 as the seal is released. This driveshaft movement transforms the orientation of the seal from the arrangement shown in FIG. 7B to that shown in FIG. 7A. When the seal is in the orientation as shown in FIG. 7A, appropriately located spray devices may be used to spray cleaning fluid onto the seal members and their separated sealing surfaces. As the pusher 94 mechanically engages the tapered nose 90 of the stationary seal 82, a reliable separation between the shoulder 88 and the tank side wall 78 is achieved as the drive shaft 76 is moved to the left in the figures. To reseal this embodiment, the drive shaft 76 is moved to the right causing rotary seal 80 to contact the metal insert 86 and force the stationary seal 82 within the opening 92. Some features of this embodiment are noteworthy. For example, as the elastomeric portion 84 is separated from the tank side wall 78, the tapered nose 90 remains within the opening 92 which prevents misalignment of the elastomeric portion 84 and insures a reliable reseating of the seal. The elastomeric portion 84 and its tapered nose 90 may also be biased radially outwardly in order that the tapered nose 90 "scrapes" the inside surface of opening 92 to help remove sediment or other contamination from the sealing surface between shoulder 88 and the tank side wall 78. Still another noteworthy feature is the use of elastomer in the elastomeric portion which provides the "spring" force to achieve a reliable seal between it and the tank side wall 78. Although the inventors have shown what they believe to be is a preferable arrangement for the shape of the elastomeric 84, it would be well known to those with skill in the art that other shapes and arrangements could be provided and yet achieve the purposes of the invention.

Figure 8:
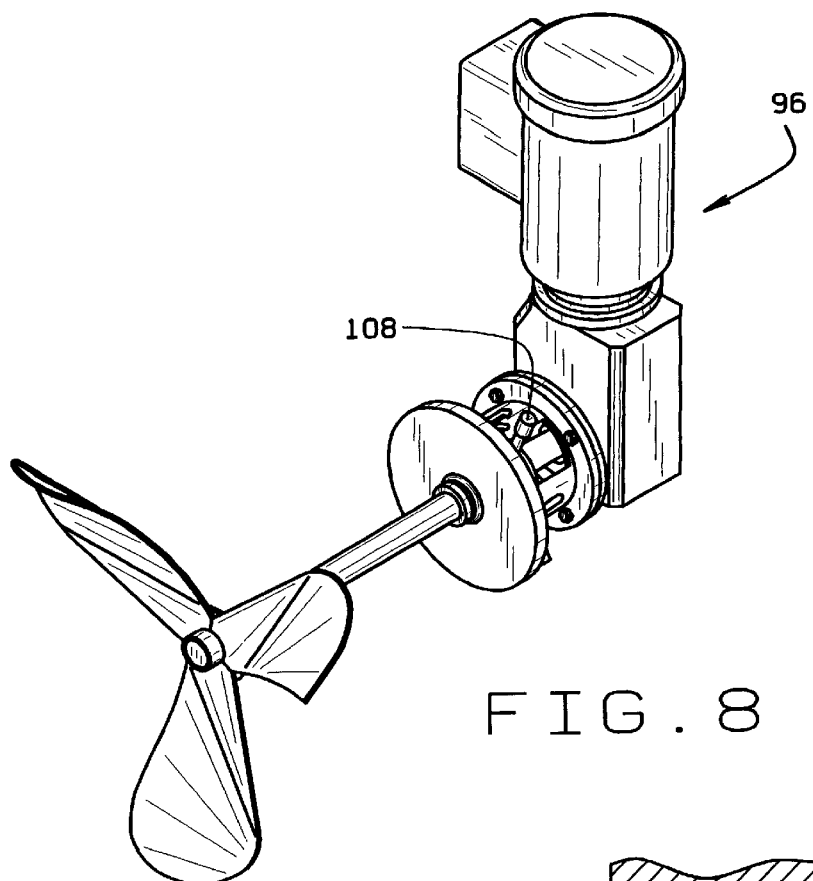
FIG. 8 is a perspective view of an agitator having a clean-in-place shaft and seal assembly of the third embodiment of the present invention.
Figure 9A:
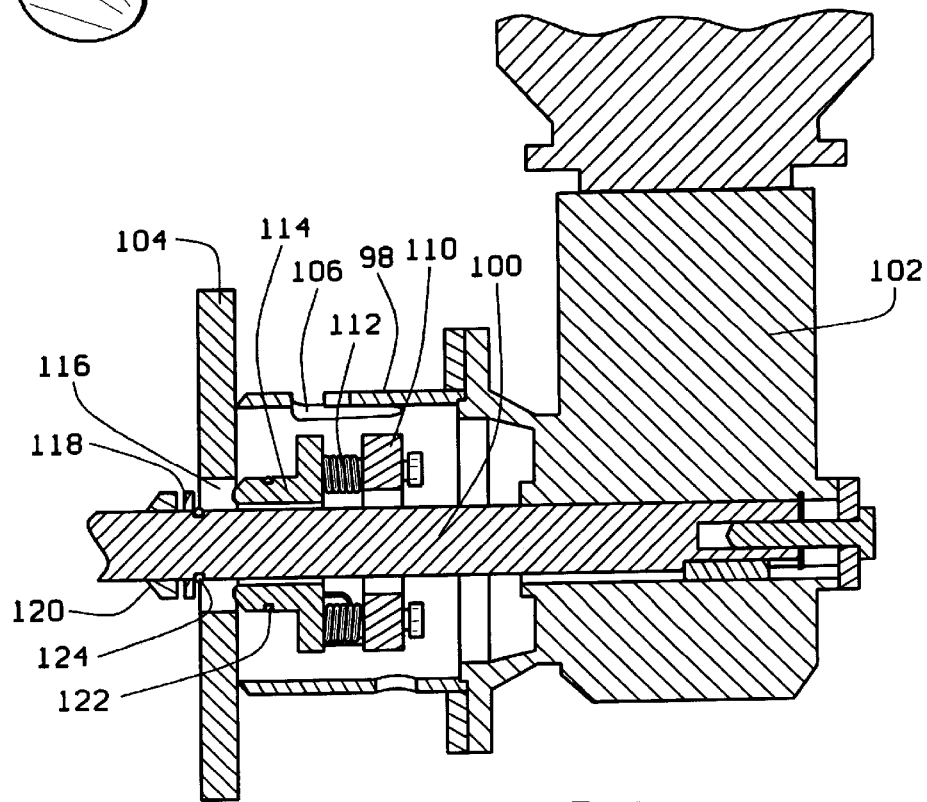
FIGS. 9A & B are cross sectional views of the shaft and seal assembly of the third embodiment as it would be oriented for cleaning and operation, respectively.
Figure 9B:
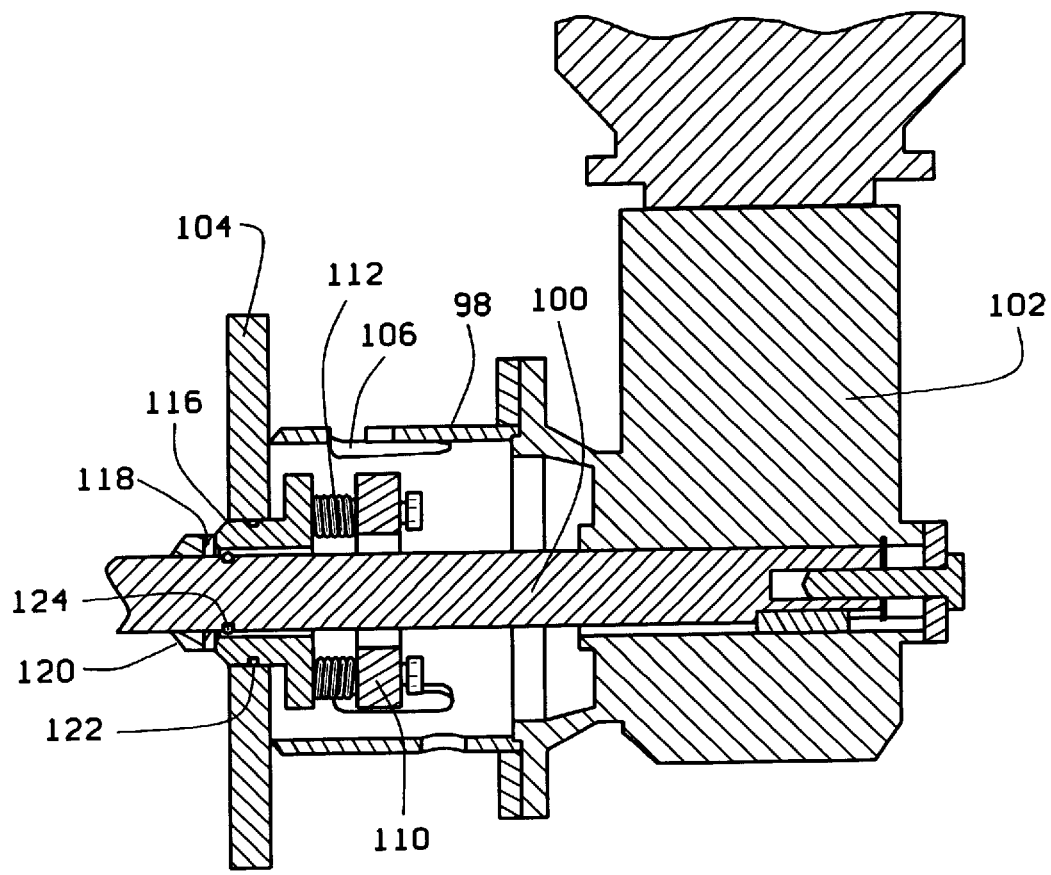

A third embodiment of the present invention is shown in FIGS. 8 and 9 and includes, as with the other embodiments, an agitator 96. However, there are some differences between this embodiment and the first two embodiments. These include a seal arrangement which locates the springs outside of the tank and which provides for seating and unseating of the seal without movement of the driveshaft with respect to the tank. These advantages are provided in a somewhat more complicated mechanical arrangement, which may not enjoy the lower costs believed to be attainable with the first two embodiments, but these advantages may be important in any particular application depending upon the material being mixed in the tank, etc. The seal of the third embodiment in it's operable or sealed orientation is shown in FIG. 9B and includes a seal housing 98 which surrounds the seal and agitator driveshaft 100 and which may be bolted to the agitator gear motor 102 and secured to the tank side wall 104, itself. The housing 98 has one or more j-slots 106 which provide a track for one or more locking handles 108 of bolt action design. The locking handle 108 is secured to an upper spring plate 110, with one or more springs 112 (preferably surrounding spring guides) extending between the upper spring plate 110 and a tapered nose sealing member 114. As shown in FIG. 9B, the tapered nose sealing member 114 extends through opening 116 and is urged against a rotary seal disk 118, the rotary seal disk 118 comprising a bonded metallic/elastomeric disk with it's metallic portion facing inwardly and resting against a seal retainer 120 which is itself fixedly secured to the driveshaft 100. An "O" ring 122 surrounding the tapered nose 114 seals it against the tank opening 116. As the driveshaft rotates, the metallic seal retainer 120 rotates and bears against the metallic portion of the rotary seal disk 118. As rotary seal disk 118 remains stationary, the tapered nose 114 of the seal provides a sealing relationship therebetween and "O" ring 122 seals the tapered nose to the tank opening 116. All of this provides a rotary seal between the driveshaft 100 and the tank side wall 104.

When it is desired to move this embodiment into an unsealed configuration for clean-in-place operation, the locking handle(s) 108 is moved within the j-slot 106 to thereby move it to the right as shown in the figure. This draws the stationary seal and the tapered nose 114 from within opening 116, as shown. The rotary seal disk 118 which might otherwise have a tendency to be retained on the end of the tapered nose 114 is prevented from following along with the tapered nose 114 as it is withdrawn from within the tank opening 116 by a pusher 124 preferable comprising an "O" ring mounted on driveshaft 100. The pusher 124 mechanically engages the rotary seal disk 118 and prevents it from being retained unintentionally on tapered nose 114. Thus, the sealing surfaces are mechanically separated for cleaning as the seal is separated. As with the other embodiments, a conveniently oriented spray device may spray cleaning fluid into the opening 116 to clean the sealing surfaces and the sediment, contaminates, and other debris located within the housing 98 are washed out of the tank instead of into the tank as with other prior art devices.

Various kinds of materials could be used to form the seals of the present invention. For example, carbon graphite or silicon carbide could be used for the dynamic seal surfaces. Additionally, washers or other separators may be used to enhance the seal between various seal members. Different kinds of spring members could be used instead of the helical springs disclosed. Other mechanical arrangements could be utilized in the third embodiment other than j-slots and locking handles in order to move the tapered nose seal member from a sealed to an unsealed condition and vice versa. Various other changes and modifications to the various embodiments of the invention may be apparent to those of ordinary skill in the art and are fairly taught within the scope of the invention, the invention being intended to be limited only by the scope of the claims appended hereto and their legal equivalents.

What is claimed is:

1. An agitator for a tank, said agitator having an impeller and a drive shaft and seal assembly allowing for clean-in-place operation with said agitator mounted through a sidewall a tank, the drive shaft having an inboard end and a longitudinal shaft axis, the impeller being operatively connected to inboard end of the shaft for agitating fluid within the tank in response to rotation of the shaft about the shaft axis, said drive shaft and seal assembly comprising a stationary seal for contacting the tank sidewall and a rotary seal mounted to said shaft and positioned for contacting said stationary seal, said rotary seal having a spring captured between a pair of end caps, one of said end caps being fixedly mounted to said shaft and the other of said end caps being located nearest said stationary seal, and a shaft mounted pusher positioned outboard of said stationary seal so that as said shaft is moved into position for clean-in-place operation said pusher mechanically engages said stationary seal and separates it from said sidewall and as said shaft is moved into operation position said rotary seal mechanically engages said stationary seal and the spring urges them together and against the sidewall, said stationary seal comprising a compound construction including a bonded metallic portion and an elastomeric portion being positioned to contact said rotary seal.

2. An agitator for a tank, said agitator having an impeller and a drive shaft and seal assembly allowing for clean-in-place operation as said agitator is mounted through a sidewall of a tank, the drive shaft having an inboard end and a longitudinal shaft axis, the impeller being operatively connected to inboard end of the shaft for agitating fluid within the tank in response to rotation of the shaft about the shaft axis, said drive shaft and seal assembly comprising a stationary seal for contacting the tank sidewall, a rotary seal mounted to said shaft and positioned for contacting said stationary seal, said stationary seal comprising a compound construction including a bonded metallic portion and a elastomeric portion, said elastomeric portion being positioned to engage the tank sidewall as the seal is engaged by said metallic portion which in turn is engaged by the rotary seal, and a pusher mounted on said shaft and inboard of said seal so that as said shaft is moved into position for clean-in-place operation said pusher mechanically engages said stationary seal and separates it from said sidewall and as said shaft is moved into operation position said rotary seal mechanically engages said stationary seal and the elastomeric portion thereof compresses to thereby create a sealing pressure against the sidewall.

3. The agitator of claim 2 wherein the elastomeric portion of said stationary seal has a tapered nose leading to a shoulder, the tapered nose helping to center the seal as it is moved into place against the sidewall.

4. The agitator of claim 3 wherein said pusher comprises a stop having a diameter sufficiently large to engage the tapered nose of said stationary seal and unseal the shoulder from the tank sidewall.

5. The agitator of claim 4 wherein said pusher has a tapered nose and shoulder which matches and lines up with the tapered nose and shoulder of said stationary seal to engage it and center it within the sidewall opening.

6. An agitator for a tank, said agitator having an impeller and a drive shaft and seal assembly allowing for clean-in-place operation as said agitator is mounted through a sidewall of a tank, the drive shaft having an inboard end and a longitudinal shaft axis, the impeller being operatively connected to inboard end of the shaft for agitating fluid within the tank in response to rotation of the shaft about the shaft axis, said drive shaft and seal assembly comprising a housing for attachment to the outside of the tank sidewall, a stationary seal slidably mounted to the agitator shaft and movably supported by said housing, said stationary seal including a nose for insertion through the tank sidewall and a spring for urging said stationary seal nose against a rotary seal also slidably mounted on said agitator shaft and within said tank, a retainer fixedly mounted on the agitator shaft outboard of said rotary seal, and a pusher mounted on said shaft so that as said stationary seal is retracted into said housing the pusher mechanically engages the rotary seal and separates it from the stationary seal nose.

7. The agitator of claim 6 further comprising a locking handle extending between and connecting the stationary seal to the housing, the housing including a track with which the locking handle engages so that locking handle movement is constrained thereby as it moves between a sealed operable position and a clean-in-place position.

8. A shaft and seal assembly for sealing an opening of a wall through which the shaft is configured to extend, the shaft and seal assembly comprising:

a shaft having a longitudinal shaft axis and axially opposite first and second ends, the shaft being dimensioned to extend axially through the opening of the wall with the first and second ends of the shaft on opposite sides of the wall, the shaft also being configured and adapted to rotate about the shaft axis relative to the wall and to be axially movable between an operating position and a cleaning position relative to the wall and the wall opening when the shaft is positioned extending axially through the wall opening;

an annular sealing member positioned on the shaft where it will sealably close the wall opening by engaging the wall when the shaft is in the operating position; and a pusher member mounted on the shaft for axial movement of the pusher member with the shaft, the pusher member being positioned on the shaft where it is spaced from the sealing member when the shaft is in the operating position and where the pusher member will engage the sealing member and separate the sealing member from the wall as the shaft is axially moved from the operating position to the cleaning position.

9. The shaft and seal assembly of claim 8, wherein:

the pusher member is mounted on the shaft to rotate with the shaft about the shaft axis.

10. The shaft and seal assembly of claim 8, wherein:

the pusher member is annular and extends around the shaft.

11. The shaft and seal assembly of claim 8, wherein:

the pusher member is axially fixed relative to the shaft.

12. The shaft and seal assembly of claim 8, wherein:

the shaft has an annular groove and a portion of the pusher member is positioned at least partially therein to axially fix the pusher member relative to the shaft.

13. The shaft and seal assembly of claim 8, wherein:

the sealing member is free to rotate about the shaft axis independently of the shaft and is configured to be held stationary against the wall when the shaft is in the operating position and the shaft is rotated about the shaft axis.

14. The shaft and seal assembly of claim 8, further comprising:

a biasing member axially attached to the shaft for biasing the sealing member against the wall when the shaft is in the operating position.

15. The shaft and seal assembly of claim 14, wherein:

the biasing member is axially attached to the shaft in a manner such that the biasing member is disengaged from the sealing member when the shaft is in the cleaning position.

16. The shaft and seal assembly of claim 14, further comprising:

a spring that axially attaches the biasing member to the shaft in a manner that allows the biasing member to axially move relative to the shaft as the spring is deflected.

17. The shaft and seal assembly of claim 14, wherein:

the sealing member is axially resilient and the biasing member is axially fixed relative to the shaft.

18. In combination, the shaft and sealing assembly of claim 8, a fluid storage tank, and an impeller, the wall being a wall of the tank that separates an internal fluid chamber of tank from an external environment, the first end of the shaft being positioned in the internal fluid chamber of the tank and the second end of the shaft being positioned in the external environment, the impeller being operatively connected to the first end of the shaft and being responsive to rotation of the shaft relative to the wall for agitating fluid within the internal fluid chamber of the tank.

19. A shaft and seal assembly for sealing an opening of a wall through which the shaft is configured to extend, the shaft and seal assembly comprising:

a shaft having a longitudinal shaft axis and axially opposite first and second ends, the shaft being dimensioned to extend axially through the opening of the wall with the first and second ends of the shaft on opposite sides of the wall, the shaft also being configured and adapted to rotate about the shaft axis relative to the wall and to be axially movable between an operating position and a cleaning position relative to the wall and the wall opening when the shaft is positioned extending axially through the wall opening;

a first annular sealing member positioned on the shaft where it will sealably close the wall opening by engaging the wall when the shaft is in the operating position, the first sealing member being dimensioned such that it is free to rotate about the shaft axis relative to the shaft and such that it will be held stationary against the wall when the shaft is in the operating position and the shaft is rotated about the shaft axis relative to the wall;

a second annular sealing member positioned on the shaft where it will engage the first sealing member when the shaft is in the operating position, the second sealing member being sealed and attached to the shaft for rotation therewith in a manner such that the second sealing member is in sliding rotational engagement with the first sealing member when the shaft is in the operating position and the shaft is rotated about the shaft axis relative to the wall, the second sealing member also being axially attached to the shaft in a manner such that the second sealing member will be axially separated from the first sealing member when the shaft is in the cleaning position; and a pusher member responsive to axial movement of the shaft and positioned on the shaft where it is spaced from the first sealing member when the shaft is in the operating position, the pusher member being shaped to engage the first sealing member and to separate the first sealing member from the wall when the shaft is axially moved from the operating position to the cleaning position.

20. The shaft and seal assembly of claim 19, wherein:
the pusher member is mounted on the shaft to rotate with the shaft about the shaft axis.

21. The shaft and seal assembly of claim 19, wherein:
the pusher member is annular and extends around the shaft.

22. The shaft and seal assembly of claim 19, wherein:
the pusher member is axially fixed relative to the shaft.

23. The shaft and seal assembly of claim 19, further comprising:

a spring mounted on the shaft that axially attaches the second sealing member to the shaft in a manner that allows the second sealing member to move axially relative to the shaft as the spring is deflected, the spring biasing the second sealing member against the first sealing member and biasing the first sealing member against the wall when the shaft is in the operating position.

24. The shaft and seal assembly of claim 19, wherein:
the first sealing member is axially resilient and the second sealing member is axially fixed relative to the shaft, the second sealing member being axially positioned on the shaft where it will partially deflect the first sealing member against the wall when the shaft is in the operating position.

25. In combination, the shaft and sealing assembly of claim 19, a fluid storage tank, and an impeller, the wall being a wall of the tank that separates an internal fluid chamber of tank from an external environment, the first end of the shaft being positioned in the internal fluid chamber of the tank and the second end of the shaft being positioned in the external environment, the impeller being operatively connected to the first end of the shaft and being responsive to rotation of the shaft relative to the wall for agitating fluid within the internal fluid chamber of the tank.

26. A shaft and seal assembly for sealing an opening of a wall through which the shaft is configured to extend, the shaft and seal assembly comprising:

a shaft having a longitudinal shaft axis and axially opposite first and second ends, the shaft being dimensioned to extend axially through the opening of the wall with the first and second ends of the shaft on opposite sides of the wall and to rotate about the shaft axis relative to the wall and the wall opening when the shaft is positioned extending axially through the opening of the wall;

a seal retainer axially and rotationally fixed to the shaft;

a first annular sealing member positioned around the shaft and axially movable between an operating position and a cleaning position relative to the shaft, the first sealing member moving axially away from the seal retainer as the first sealing member moves from the operating position to the cleaning position, the first sealing member being dimensioned such that the shaft is free to rotate relative to the first sealing member and such that it will seal against and remain stationary relative to the wall when the shaft is positioned extending axially through the opening of the wall and the first sealing member is in the operating position;

a second annular sealing member positioned around the shaft where it will be axially biased between the first sealing member and the seal retainer to sealably close the wall opening when the shaft is positioned extending axially through the wall opening and the first sealing member is in the operating position, the second sealing member being dimensioned to permit the second sealing member to axially slide relative to the shaft; and a pusher member axially fixed to the shaft and positioned where it is spaced from the second sealing member when the shaft is positioned extending axially through the wall opening and the first sealing member is in the operating position, the pusher member being shaped to engage the second sealing member to limit axial translation of the second sealing member relative to the shaft as the first sealing member is moved from the operating position to the cleaning position to axially separate the second sealing member from the first sealing member.

27. The shaft and seal assembly of claim 26, wherein:
the first sealing member has an O-ring positioned where it will engage with the opening of the wall and radially deform thereagainst to sealably close the wall opening when the first sealing member is in the operating position and where it will be separated from the wall opening when the first sealing member is in the cleaning position.

28. The shaft and seal assembly of claim 26, wherein:
the shaft has an annular groove and a portion of the pusher member is positioned at least partially therein to axially fix the pusher member relative to the shaft.

29. The shaft and seal assembly of claim 26, wherein:

the second sealing member remains stationary relative to the first sealing member when the first sealing member is in the operating position.

30. The shaft and seal assembly of claim 29, wherein:

the second sealing member is axially separated from the seal retainer as the first sealing member is moved from the operating position to the cleaning position.

31. In combination, the shaft and sealing assembly of claim 26, a fluid storage tank, and an impeller, the wall being a wall of the tank that separates an internal fluid chamber of tank from an external environment, the first end of the shaft being positioned in the internal fluid chamber of the tank and the second end of the shaft being positioned in the external environment, the impeller being operatively connected to the first end of the shaft and being responsive to rotation of the shaft relative to the wall for agitating fluid within the internal fluid chamber of the tank.

32. The combination of claim 31, wherein:

the seal retainer is positioned on the shaft where it is within the fluid chamber of tank and the first sealing member is positioned closer to the second end of the shaft than the seal retainer.

* * * * *